United States Patent [19]
Macklin et al.

[11] Patent Number: 5,441,832
[45] Date of Patent: Aug. 15, 1995

[54] ELECTROCHEMICAL CELL

[75] Inventors: William J. Macklin, Oxford; Andrew Davies; Richard J. Hobson, both of Reading, all of United Kingdom

[73] Assignee: United Kingdom Atomic Energy Authority, Harwell, United Kingdom

[21] Appl. No.: 100,441

[22] Filed: Aug. 2, 1993

[30] Foreign Application Priority Data

Aug. 1, 1992 [GB] United Kingdom ............... 9216393

[51] Int. Cl.$^6$ ............................................. H01M 4/48
[52] U.S. Cl. ................................. 429/218; 252/182.1
[58] Field of Search ............... 429/218; 252/182.1; H01M 4/48

[56] References Cited

U.S. PATENT DOCUMENTS 4,310,609  1/1982  Liang et al. .................. 429/218 X

*Primary Examiner*—John S. Maples
*Attorney, Agent, or Firm*—William R. Hinds

[57] ABSTRACT

A secondary cell includes as its active cathode material a first insertion material, such as $V_6O_{13}$, into which ions are inserted during discharge. To prevent irreversible lattice changes leading to a decline in capacity the discharge should be terminated before a threshold cell voltage is crossed. Such irreversible changes are suppressed by including in a surface coating of the cathode a minor proportion of a second insertion material, such as a titanium oxide, whose discharge commences before the threshold cell voltage is reached.

8 Claims, 2 Drawing Sheets

ELECTROCHEMICAL CELL

This invention relates to a secondary electrochemical cell with an insertion material as its active cathode material, and to a cathode for such a cell.

The use of an insertion material (for example $V_6O_{13}$, $V_2O_5$ or $TiS_2$) as the active cathode material in an electrochemical cell is known for example from GB 2 139 410. Such a cell exhibits secondary behaviour because ions (for example lithium ions) can be inserted into the structure of the insertion material during discharge of the cell, and can be subsequently removed from it during charging. This insertion is repeatedly reversible unless it exceeds a threshold at which the insertion material is irreversibly altered to one with poor lithium cycling capacity; this alteration is probably due to an alteration in the lattice structure. The degree of insertion can be monitored by monitoring the voltage of the cell during discharge, and typically the voltage decreases during the course of a discharge but with one or more plateaux.

Hence such irreversible alterations of the insertion material which lead to poor lithium cycling capacity can be prevented by monitoring the cell voltage during discharge and by terminating discharge when the voltage reaches a preset value. To maximize the energy output from such a cell this preset voltage should be as low as possible, though it must be no lower than the threshold voltage corresponding to the threshold degree of insertion. In practice the preset value has to be set significantly above that threshold voltage, as the degree of insertion will not be exactly uniform throughout the cathode material. A cell in which the preset voltage could be closer to the threshold voltage while being reliably reversible would be advantageous.

According to the present invention, there is provided a cathode for a reversible electrical cell comprising a layer comprising, as active material, only a first insertion material, with a surface coating comprising both the first insertion material and a minor proportion of a second insertion material whose discharge commences at a cell voltage above that at which irreversible changes occur to the first insertion material which cause a decline in cell cycling capacity.

It is desirable if the second insertion material has a discharge voltage plateau above the voltage at which irreversible changes occur to the first insertion material. Preferably the discharge of the second insertion material commences at between 0.1 and 0.5 V above the voltage at which irreversible changes occur to the first insertion material; if the second insertion material has a voltage plateau this is preferably between 0.05 and 0.25 V above the voltage at which irreversible changes occur to the first insertion material.

The invention will now be further described by way of example only, and with reference to the accompanying drawings in which.

Each of the cells described below is a solid state lithium cell with a polymer electrolyte. In each case the anode is lithium foil on a nickel current collector; the electrolyte is poly(ethylene oxide) (PEO) complexed with a lithium salt such as $LiClO_4$, which may be prepared by evaporation from a solution of PEO and $LiClO_4$ in acetonitrile; and the cathode comprises active insertion material, carbon black, and electrolyte on a nickel current collector.

Figure 1:
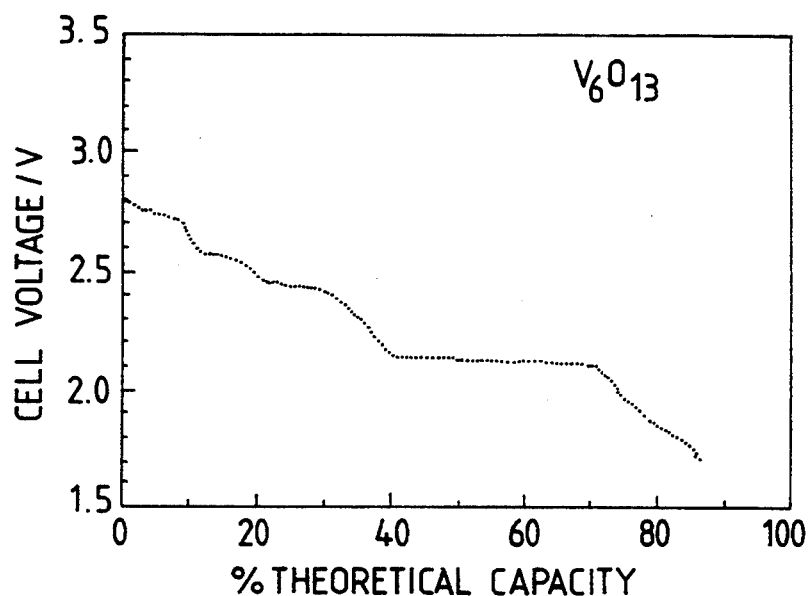
FIG. 1 shows graphically the discharge of a cell with a cathode comprising $V_6O_{13}$.

Referring to FIG. 1 there is shown the discharge curve for the first discharge of a cell as described above, with $V_6O_{13}$ as the insertion material in the cathode. It will be observed that there is a long plateau at about 2.1 V. Irreversible changes occur to the $V_6O_{13}$ if the discharge is allowed to proceed further than to a cell voltage of 1.7 V.

Figure 2:
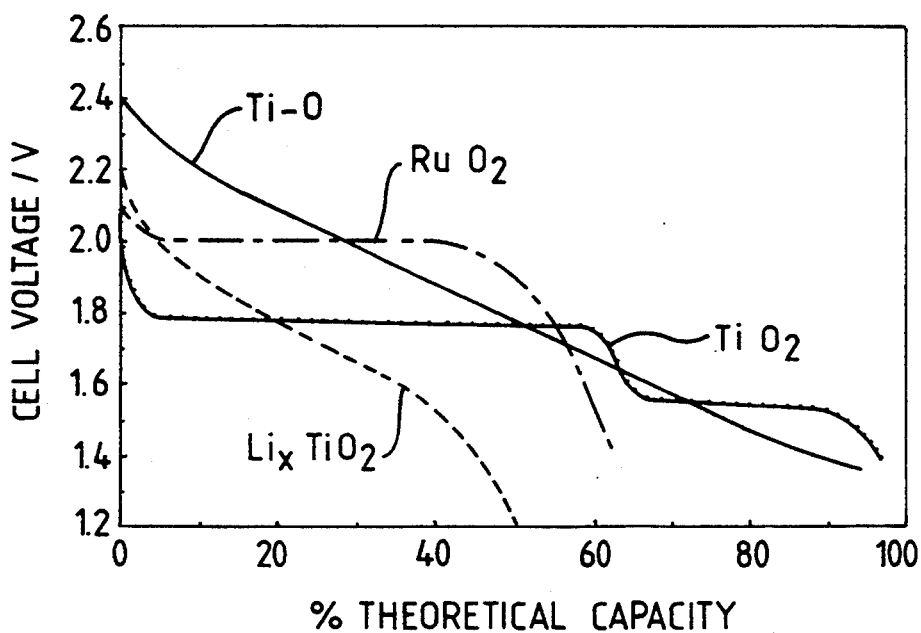
FIG. 2 shows graphically the discharge of cells with cathodes comprising anatase $TiO_2$, amorphous titanium oxide, $Li_xTiO_2$, and $RuO_2$.

Referring now to FIG. 2 there are shown discharge curves for cells with four different cathode materials, each of which has a discharge which commences at a voltage above 1.7 V and which provides a significant degree of its capacity (over 20% in each case) for discharge voltages above 1.7 V. In one case the insertion material is ruthenium oxide, $RuO_2$; the electrolyte has an [EO]:[Li] ratio of 8; the discharge occurs at 80° C.; and the curve for the fifth discharge is shown. It will be observed that the discharge commences at about 2.1 V, and that there is a plateau at 2.0 V up to about 40% of the total capacity. (This information comes from an article by P. Dalard et al., Solid State Ionics 15 (1985) 91–94).

Two curves are for where the insertion material is a form of titanium dioxide, in one case the anatase form (marked $TiO_2$), and in the other case an amorphous titanium oxide (marked Ti-O) prepared by hydrolysis of the alkoxide. In each case the electrolyte has an [EO]:[Li] ratio of 12; the discharge occurs at 120° C.; and the first discharge curve is shown. With anatase titania the discharge commences at about 2.3 V, rapidly dropping to a plateau at 1.78 V which continues to about 60% of total capacity, and there is then a second plateau at about 1.55 V. With amorphous titania the discharge commences at about 2.4 V and drops continuously, though with about 60% of the total capacity at a voltage above 1.7 V.

The fourth curve is that where the insertion material is $Li_xTiO_2$ with x between 0.5 and 1.0, formed in situ by discharge of a cell initially containing the rutile form of titanium dioxide. The electrolyte has an [EO]:[Li] ratio of 12; the discharge occurs at 120° C.; and the curve for the tenth discharge is shown. The discharge commences at about 2.2 V and drops continuously, though over 25% of the total capacity is at a voltage above 1.7 V. This electrode material is readily and repeatedly reversible.

Thus the present disclosure teaches that if the principal insertion material in the cathode is $V_6O_{13}$, so that insertion of lithium ions must not proceed beyond that corresponding to a discharge voltage of 1.7 V (to prevent irreversible changes to the insertion material), the performance of the cell can be enhanced by incorporating in the cathode a minor proportion, for example 10% by mass, of $RuO_2$, anatase or amorphous $TiO_2$, or $Li_xTiO_2$ as described above. This second insertion material experiences the bulk of its discharge once the $V_6O_{13}$ has reached the end of its 2.1 V plateau, and so reduces the degree to which excessive lithium insertion into the $V_6O_{13}$ lattice can occur. Nevertheless the discharge must still be terminated before the cell voltage drops to 1.7 V. It should also be noted that, comparing the two forms of titania, amorphous titania can be expected to be more effective as a second insertion material than anatase, because anatase titania does not provide significant capacity until the plateau at 1.78 V is reached, which is less than 0.1 V above the threshold voltage of 1.7 V.

Figure 3:
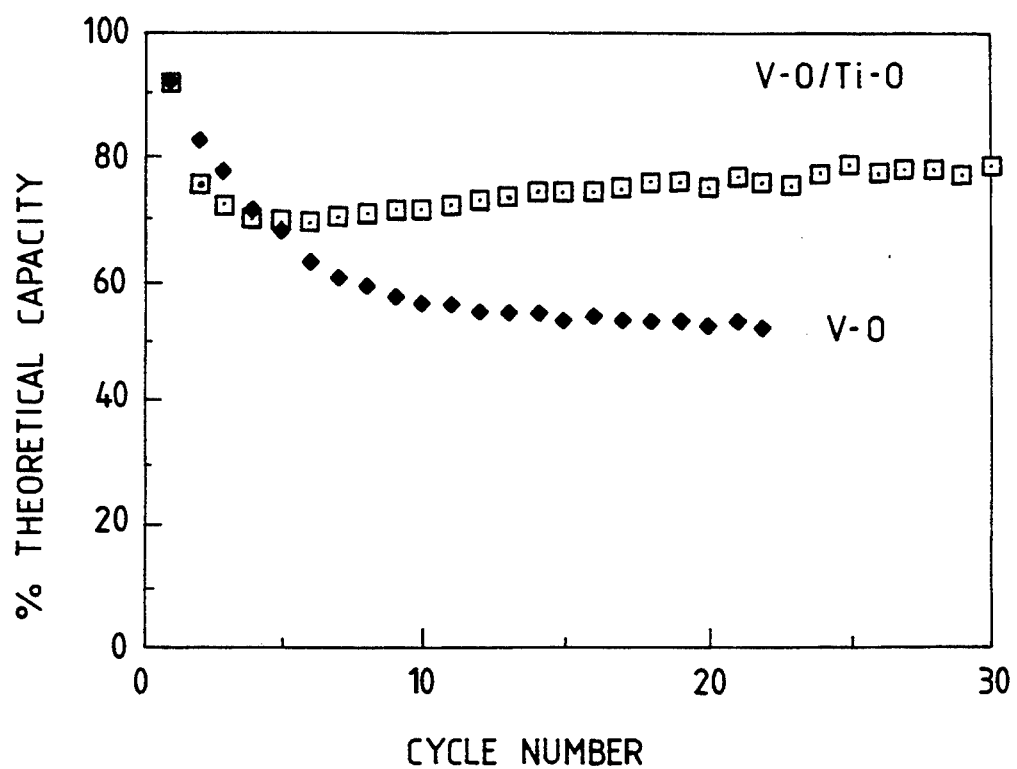
FIG. 3 shows graphically the variation of cell capacity with number of cycles, for a cell with a cathode comprising vanadium oxide, and for a cell of the invention with a cathode comprising a vanadium oxide and a titanium oxide.

Referring now to FIG. 3 there is shown graphically the variation in the capacity of a lithium cell with the number of discharge/charge cycles for two different cathodes, the first containing only vanadium oxide as the insertion material (marked V-O), and the second containing both vanadium oxide and titanium oxide as insertion materials (marked V-O/Ti-O). It will be observed that the second cell maintains its capacity much better during cycling.

The experimental results shown in FIG. 3 were obtained with cells cycled at 120° C. between the voltage limits suitable for a $V_6O_{13}$ cathode (i.e. charging up to 3.4 V, discharging down to 1.7 V). Both the oxides were amorphous materials prepared by hydrolysis of the corresponding alkoxides, and were of the type $VO_y$ where y is between 2.4 and 2.5, and amorphous $TiO_2$ respectively. The discharge curve for such an amorphous $VO_y$ cell differs somewhat from that of $V_6O_{13}$ shown in FIG. 1 in not having plateaux, but the threshold voltage below which the lithium cycling capacity would decline is the same. (It has in fact been found in $V_6O_{13}$ cells cycled at 120° C., that over about ten cycles the insertion material undergoes a structural change to an amorphous vanadium oxide whose discharge curve is substantially the same as that of this $VO_y$ cell; this structural change does not lead to a decline in capacity).

It has been found that the benefits indicated above in relation to FIG. 3 can be achieved with mixtures containing between 5 and 20% of the titanium oxide. They are also achieved with an insertion material comprising an amorphous mixed vanadium/titanium oxide with similar proportions for example of the form $V_{0.9}Ti_{0.1}O_y$; such an oxide can be formed by hydrolysis of a mixture, in appropriate proportions, of suitable vanadium and titanium alkoxides.

The role of the second insertion material is principally of importance at the front surface of the cathode, in contact with the electrolyte, as the lithium ion flux is greatest there. Consequently a cathode embodying the invention might take the form of a current collector with a first layer, say 30 microns thick, comprising only the first insertion material (e.g. vanadium oxide), coated with a second layer, say 10 microns thick, comprising both the first and the second insertion materials (e.g. vanadium oxide and titanium oxide).

We claim:

1. A cathode for a reversible electrical cell comprising a layer comprising, as active material, only a first insertion material, with a surface coating comprising both the first insertion material and a minor proportion of a second insertion material whose discharge commences at a cell voltage above that at which irreversible changes occur to the first insertion material which cause a decline in cell cycling capacity.

2. A cathode as claimed in claim 1 wherein the minor proportion is less than 20% of the mass of the first insertion material in the surface coating.

3. A cathode as claimed in claim 2 wherein the minor proportion is about 10% of the mass of the first insertion material in the surface coating.

4. A cathode as claimed in claim 1 wherein at least 20% of the capacity of the discharge of the second insertion material takes place at a voltage above the said cell voltage.

5. A cathode as claimed in claim 1 wherein the second insertion material has a discharge voltage plateau between 0.05 and. 0.25 V above the said cell voltage.

6. A cathode as claimed in claim 1 wherein the first insertion material is an amorphous vanadium oxide and the second insertion material is an amorphous titanium oxide.

7. A reversible electrical cell incorporating a cathode as claimed in claim 1.

8. A cathode as claimed in claim 1 wherein the first and the second insertion materials in the coating are in the form of a mixture of the first and of the second insertion material, and the second insertion material is selected from the group consisting of ruthenium oxide, anatase titanium dioxide, amorphous titanium dioxide, and lithium titanium dioxide $Li_xTiO_2$ with x between 0.5 and 1.0 formed from rutile titanium dioxide.

* * * * *

UNITED STATES PATENT AND TRADEMARK OFFICE
CERTIFICATE OF CORRECTION

PATENT NO. : 5,441,832
DATED : August 15, 1995
INVENTOR(S) : William J. Macklin; Andrew Davies; Richard J. Hobson It is certified that error appears in the above—identified patent and that said Letters Patent is hereby corrected as shown below:

On the title page, item [56], the following is added:

U.S. PATENT DOCUMENTS

| | | | |
|---|---|---|---|
| 5,342,712 | 08/1984 | Mieczkowska et al | 429/224 |
| 4,737,424 | 04/1988 | Tobishima | 429/197 |

FOREIGN PATENT DOCUMENTS

| | | |
|---|---|---|
| 0391281 | 10/1990 | European Pat. Off. |
| 0511632 | 11/1992 | European Pat. Off. |
| 4108805 | 09/1991 | Germany |
| 64-6384/ | 01/1989 | Japan |
| 01-6384 | 01/1989 | Japan |
| 2033138 | 05/1980 | United Kingdom |
| 2234108 | 01/1991 | United Kingdom |
| 2235566 | 03/1991 | United Kingdom |

OTHER PUBLICATIONS

Derwent Accession Number 87-267705 & JP 62186466 (NIPPON).
Derwent Accession Number 81-50867D & JP 56061771 (NIPPON).
Patent Abstracts of Japan, Vol. 11, No. 083 (E489) 03/13/87, & JP61239562 (MATSUSHITA ELECTRIC IND CO LTD).
Patent Abstracts of Japan, Vol. 12, No. 17(E-574) January 19, 1988, & JP62176055 (NIPPON TELEGR & TELEPH CORP).
Patent Abstracts of Japan, Vol. 13, No. 160(E744) April 18, 1989, & JP63314778 (MATSUSHITA ELECTRIC IND CO LTD).
Patent Abstracts of Japan, Vol. 13, No. 246(E-769) June 8, 1989, & JP 61-48383 (MATSUSHITA ELECTRIC IND CO LTD).
Patent Abstracts of Japan, Vol. 15, No. 295(E1094) July 26, 1991, & JP3105858 (TOSHIBA CORP.).
Patent Abstracts of Japan, Vol. 16, No. 312(E1230) July 9, 1992, & JP4087152 (SANYO ELECTRIC CO LTD).
M.G. Minett and J.R. Owen, "Vanadium and Titanium Oxides Prepared by Hydrolysis of Alkoxides as Insertion Electrodes in Lithium Cells with Polymeric Electrolytes," JOURNAL OF POWER SOURCES, Vol. 32, No. 1, July, 1990, pages 81-97.

UNITED STATES PATENT AND TRADEMARK OFFICE
CERTIFICATE OF CORRECTION

PATENT NO. : 5,441,832

DATED : August 15, 1995

INVENTOR(S) : William J. Macklin; Andrew Davies; Richard J. Hobson

It is certified that error appears in the above—identified patent and that said Letters Patent is hereby corrected as shown below:

OTHER PUBLICATIONS

Whittingham et al, "A Mixed Rate Cathode for Lithium Batteries," JOURNAL OF THE ELECTROCHEMICAL SOCIETY, February, 1981, pages 485-486.

Column 1, between lines 45 and 46, the following paragraph is added:

-- Preferably the mass of the second insertion material is less than 20% of the mass of the first insertion material, more preferably about 10% for example between 8% and 12%.--

Signed and Sealed this

Fifteenth Day of October, 1996

Attest:

BRUCE LEHMAN

Attesting Officer

Commissioner of Patents and Trademarks